June 1, 1926.
J. C. BARKER
DIVISIBLE RIM FOR VEHICLE WHEELS
Filed March 21, 1924
1,587,360
2 Sheets-Sheet 1
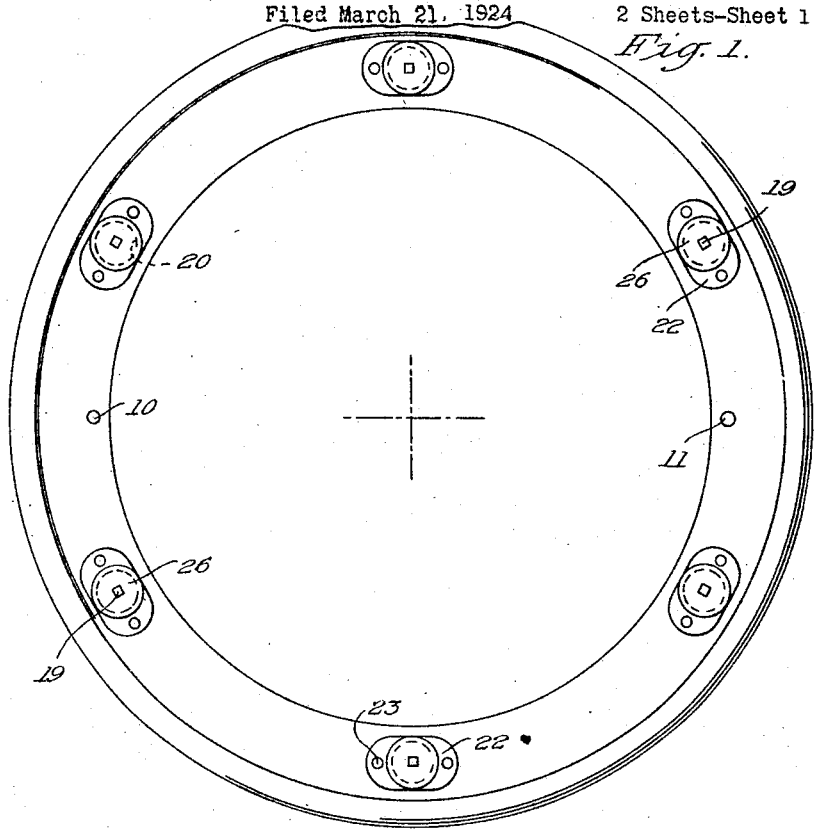
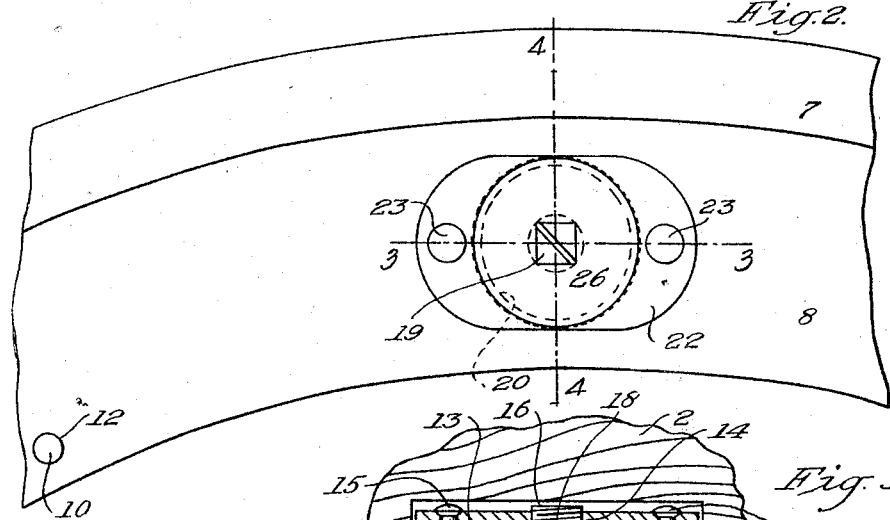

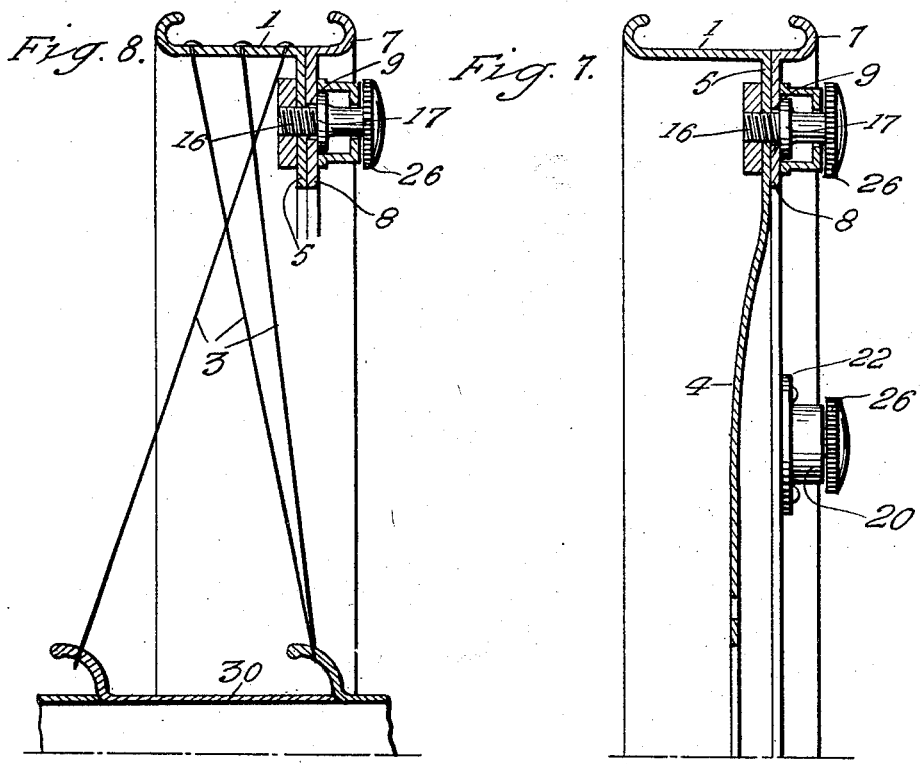
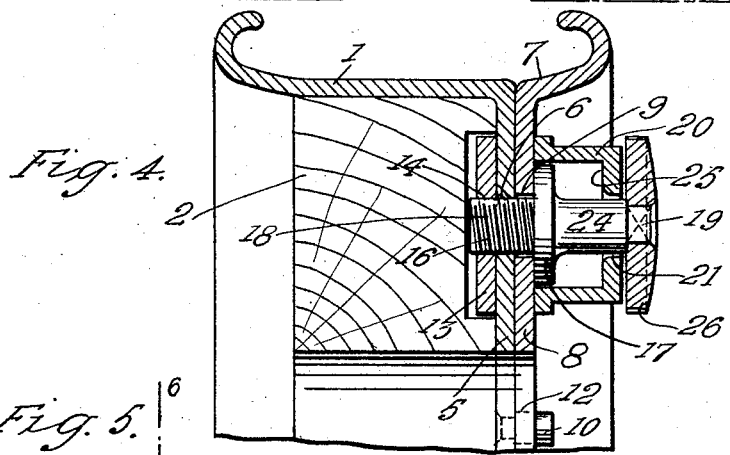
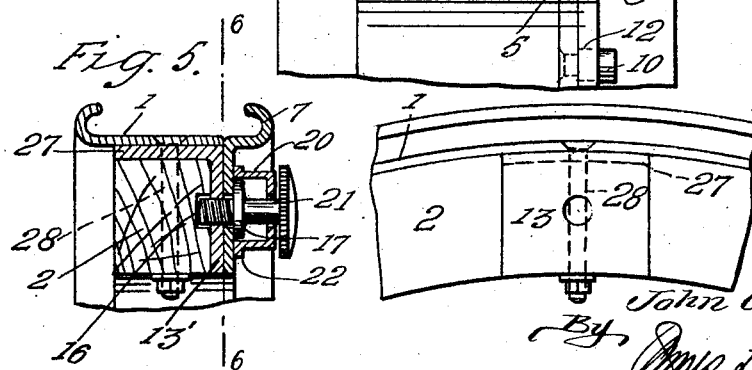

Patented June 1, 1926.

1,587,360

UNITED STATES PATENT OFFICE.

JOHN CHARLES BARKER, OF LONDON, ENGLAND, ASSIGNOR OF ONE-HALF TO MARY LOUISA SIMPSON, OF LONDON, ENGLAND.

DIVISIBLE RIM FOR VEHICLE WHEELS.

Application filed March 21, 1924, Serial No. 700,878, and in Great Britain June 30, 1923.

This invention relates to divisible rims for wheels of motor and other vehicles, the rim being of the kind comprising an inner portion that is fixed to a wood or metal felloe member or is secured to the wheel spokes or equivalent member or members, and an outer or removable portion detachably connected to the fixed rim portion, each rim portion having a suitably shaped part that forms a seat for the wheel tyre, and a radially and inwardly extending flange part which is integral with or otherwise secured to the rim portion.

According to the invention the removable rim portion may be easily and quickly connected to the fixed rim portion and the dropping and loss of the rim connecting studs is avoided. The removable rim portion is detachably secured to the fixed rim portion by a series of set screws or locking studs, which are of a special construction and arranged at suitable distances apart in a circumferential row round the wheel. These studs extend through apertures in the flange of the rim portion by which they are carried and are screwed into registering threaded holes provided to receive them in the flange of the other rim portion. Each locking stud is provided with a device or means which, while permitting the stud to be inserted or screwed into the radially extending flange of the inner rim portion, prevents the stud when disengaged or unscrewed from the flange of the inner rim portion from being bodily withdrawn or disengaged from that flange, so that there is no possibility of the studs being dropped or lost during a rim-removing or replacing operation.

The invention will be described with reference to the accompanying drawing, in which:—

Fig. 1 is an elevation of a wheel embodying the invention, the hub and spokes or elements connecting the hub and rim, being omitted.

Fig. 2 is an elevation to an enlarged scale of a portion of the rim illustrated in Fig. 1.

Fig. 3 is a horizontal section on line 3—3 in Fig. 2, parts being shown in elevation.

Fig. 4 is a cross section on the line 4—4 in Fig. 2, the wheel having a wooden felloe.

Fig. 5 is a cross section through a wheel rim having a wooden felloe and embodying a modified form of the invention.

Fig. 6 is a side elevation of the portion of wheel rim shown in Fig. 5, with parts to the right of the line 6—6 in that figure removed.

Fig. 7 is part vertical section of a disc wheel embodying the invention, and

Fig. 8 is a similar section of a wheel having wire spokes between the hub and rim and embodying the invention.

In the several figures corresponding parts are indicated by corresponding reference numerals.

In the drawings, 1 denotes the portion of the rim that is either fixed to a felloe 2 which may be of wood, as in Figs. 3, 4 or 5, or is secured to spokes 3 that may be of wire connected to a hub 30, as shown for example in Fig. 8, or of other suitable material, or is formed integrally with a central part 4 connecting the wheel hub and rim, as in the disc wheel shown in Fig. 7. The rim portion is provided with a radial flange 5 which in the case of a disc wheel would be integral with the central part 4. In the flange 5 is a circumferential row of threaded holes 6 which are referred to below. The detachable rim portion is indicated by the reference numeral 7 and is formed with a radial flange 8 in which is a circular row of holes 9 arranged to be in register with the holes 6 when the fixed and detachable rim portions 1 and 7 are properly assembled together. To ensure that those portions may be so assembled, one of them may be provided with a pair of locating pins 10 and 11, one of which is preferably of a size larger than the other, the pins being adapted to project into apertures 12 formed on the other rim portion when the two rim portions are brought together in the proper relative positions.

On that face of the flanged part 5 of the inner fixed rim portion 1 which is further from the rim flange 8 are fixed a series of apertured strengthening plates 13, one opposite each threaded hole in the flange 5, the aperture 14 in each plate being screw-threaded similarly to the hole 6. The plate may be fixed to the flange 5 of the inner rim portion 1 in any convenient manner, as for instance by means of rivets 15, Fig. 3.

The holes 6 and 9 in the flanges 5 and 8 are provided for the reception of set screws or studs 16 for locking those flanges together. Each locking stud 16 is provided between its ends with a circular flange or shoulder 17, and the part 18 of the stud between the shoulder and one end is screw-threaded while the part between the shoulder and the other end or its head is devoid of threads. The terminal portion or head 19 of this latter part is suitably shaped for operating or turning the stud for the purpose of screwing it into the threaded holes 6 and 14, or withdrawing it therefrom.

The flanges or shoulders 17 on the locking studs are each so arranged that, when the studs are screwed home through the holes in the flanges of the outer rim portions into the threaded apertures of the inner flange and the apertures of a juxtaposed strengthening plate 13, the flanges 17 will bear against the outer face of the flange 8 of the removable or outer rim portion 7. A flanged cylindrical cup or socket piece 20, open at one end and closed at the other, except for a central aperture 21, is placed over the flange 17 of each stud so as to imprison it, as shown in Figs. 3, 4, 5 and 7, and by means of its flange 22 the cup is fixed by rivets 23 or in any other suitable manner to the outer face of the flange of the removable rim portion 7, as shown in Fig. 3.

The unthreaded part 24 of the stud shank is of such a length that its shaped shank end 19 will project through the aperture 21 in the end of the cup and so be accessible for turning the stud. The internal diameter of the cup is slightly larger than the diameter of the annular flange 17 of the locking stud, and the length or depth of the cylindrical bore of the cup is such that when, in the act of withdrawing the stud associated therewith from the fixed rim portion, the flange 17 will engage against the inner face 25 of the apertured end of the cup.

By reason of the locking studs having, under all circumstances, a greater or less length of their threaded shanks in threaded engagement with, or located within the holes 9 of the removable rim, there is no possibility of the locking studs being dropped or lost during a rim-removing operation, and as the stud heads protrude at all times beyond the cup ends the studs can be very easily and quickly turned.

The heads of the studs 16 may, for manipulating purposes and appearance sake, be fitted with discs 26 having milled peripheral edges, the studs preferably being made sufficiently long for the heads thereof to project beyond or be flush with the outer faces of the cups. By turning the discs the studs can be screwed into and out of the plates 13 and flange 5.

In the modified construction illustrated in Fig. 5, the strengthening plates 13' are angled or formed with a flange or limb 27 arranged to underlie the fixed rim portion 1, the felloe 2 being notched on its circumferential face and also on its outer face to accommodate the parts 13' and 27. The rim portion 1, the strengthening plate 13', 27, and the felloe 2 may be secured together by means of a bolt 28.

Having thus described the nature of the said invention and the best means I know of carrying the same into practical effect, I claim:—

In a wheel rim comprising a pair of members separable in a plane at a right angle to the axis of the wheel and wherein each stud in a row of locking studs carried by one of said members engages the other member to secure said members together, means for preventing the bodily disengagement of the locking studs from the member by which they are carried, said means comprising a shoulder formed integrally with the shank of each locking stud intermediate the head and the point thereof and adapted to bear against the exposed outer face of the member by which it is carried, and a circular row of cup-shaped devices corresponding in number with that of the studs, each cup-shaped device secured to the said exposed outer face and imprisoning one of said shoulders and having an aperture in its bottom through which the head end of the stud projects, the sliding movement of each stud within the corresponding cup-shaped device being limited in one direction by engagement of the shoulder of the stud with the said exposed outer face and in the opposite direction by engagement of said shoulder with the bottom of said cup-shaped device.

In testimony whereof I have signed my name to this specification.

JOHN CHARLES BARKER.